(12) United States Patent
Luo et al.

(10) Patent No.: US 11,328,397 B2
(45) Date of Patent: May 10, 2022

(54) LIGHT-SPLITTING COMBINED IMAGE COLLECTION DEVICE

(71) Applicant: Hangzhou Hikvision Digital Technology Co., Ltd., Hangzhou (CN)

(72) Inventors: Lihong Luo, Hangzhou (CN); Xinxin Nie, Hangzhou (CN); Meng Fan, Hangzhou (CN); Hai Yu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/334,257

(22) PCT Filed: Jun. 2, 2017

(86) PCT No.: PCT/CN2017/086976
§ 371 (c)(1),
(2) Date: Mar. 18, 2019

(87) PCT Pub. No.: WO2018/049849
PCT Pub. Date: Mar. 22, 2018

(65) Prior Publication Data
US 2019/0213723 A1    Jul. 11, 2019

(30) Foreign Application Priority Data

Sep. 19, 2016    (CN) .......................... 201610830005.6

(51) Int. Cl.
*G06T 5/50*     (2006.01)
*G06T 5/00*     (2006.01)
(Continued)

(52) U.S. Cl.
CPC ................ *G06T 5/50* (2013.01); *G06T 5/009* (2013.01); *G06T 5/20* (2013.01); *H04N 5/2258* (2013.01);
(Continued)

(58) Field of Classification Search
USPC .......................................... 386/227, 223–224
See application file for complete search history.

(56) References Cited

U.S. PATENT DOCUMENTS

| 8,503,778 B2 | 8/2013 | Sim et al. |
| 2004/0125106 A1* | 7/2004 | Chen .................... H04N 13/133 345/426 |

(Continued)

FOREIGN PATENT DOCUMENTS

| CN | 101714251 A | 5/2010 |
| CN | 103024281 A | 4/2013 |

(Continued)

OTHER PUBLICATIONS

International Search Report for International Application No. PCT/CN2017/086976 dated Aug. 25, 2017.

(Continued)

*Primary Examiner* — Hung Q Dang
(74) *Attorney, Agent, or Firm* — Clements Bernard Baratta; Lawrence A. Baratta, Jr.

(57) ABSTRACT

An image collection device for light splitting and fusion is provided. In the image collection device, a light splitter splits incident light into a visible light and a non-visible light; a visible spectrum imaging module performs photosensitive imaging according to the visible light split by the light splitter to form a first visible light image; a non-visible spectrum imaging module performs photosensitive imaging according to the non-visible light split by the light splitter to form a first non-visible light image; a registration unit performs position registration on the first visible light image and the first non-visible light image to obtain a target visible light image and a second non-visible light image; a pre-processing synthesizing unit performs brightness adjustment on the second non-visible light image to obtain a target non-visible light image; a fusion unit performs image fusion (Continued)

on the target visible light image and the target non-visible light image to obtain a fused image. By this solution, the color accuracy of the fused image can be ensured effectively.

11 Claims, 3 Drawing Sheets

(51) Int. Cl.
    *G06T 5/20*     (2006.01)
    *H04N 5/225*     (2006.01)
    *H04N 5/235*     (2006.01)
    *H04N 9/67*     (2006.01)
    *H04N 9/78*     (2006.01)
    *G06T 7/13*     (2017.01)
    *G06T 7/33*     (2017.01)
    *G06T 3/00*     (2006.01)
    *G06T 7/90*     (2017.01)
    *H04N 5/243*     (2006.01)
    *G06T 5/40*     (2006.01)
    *G06T 7/00*     (2017.01)

(52) U.S. Cl.
    CPC ......... *H04N 5/2351* (2013.01); *H04N 5/2354* (2013.01); *H04N 9/67* (2013.01); *H04N 9/78* (2013.01); *G06T 7/13* (2017.01); *G06T 7/33* (2017.01); *G06T 2207/10024* (2013.01); *G06T 2207/10048* (2013.01); *G06T 2207/20221* (2013.01)

(56) References Cited

U.S. PATENT DOCUMENTS

| | | | | |
|---|---|---|---|---|
| 2009/0002475 A1* | 1/2009 | Jelley | .................... | H04N 5/2256 348/14.01 |
| 2010/0231716 A1 | 9/2010 | Klaerner et al. | | |
| 2010/0290703 A1 | 11/2010 | Sim et al. | | |
| 2010/0314543 A1* | 12/2010 | Lee | ........................ | G01S 7/4816 250/330 |
| 2011/0200319 A1* | 8/2011 | Kravitz | .................. | G03B 17/02 396/333 |
| 2014/0168444 A1 | 6/2014 | Bae et al. | | |
| 2015/0269735 A1* | 9/2015 | Tateno | ................. | G06K 9/4671 382/153 |
| 2015/0341619 A1* | 11/2015 | Meir | ..................... | H04N 13/257 348/47 |
| 2015/0381893 A1* | 12/2015 | Miyasako | .......... | H04N 5/23287 348/208.6 |
| 2018/0027164 A1 | 1/2018 | Zhou et al. | | |
| 2018/0069996 A1* | 3/2018 | Shukla | ................. | H04N 5/2258 |

FOREIGN PATENT DOCUMENTS

| | | |
|---|---|---|
| CN | 105678727 A | 6/2016 |
| CN | 105874779 A | 8/2016 |
| EP | 2 309 449 A1 | 4/2011 |
| JP | 2002139772 A | 5/2002 |
| JP | 2006180269 A | 7/2006 |
| JP | 2013255144 A | 12/2013 |
| KR | 20060071893 A | 6/2006 |
| KR | 20140080744 A | 7/2014 |
| KR | 20150011098 A | 1/2015 |

OTHER PUBLICATIONS

Anonymous: "Hot Mirror—Wikipedia", Jul. 17, 2016; Retrieved from the internet:URL:https://en.wikipedia.org/w/index.php?title=Hot_mirror&oldid=730241936 retrieved on Aug. 5, 2019.
First Office Action of the corresponding EP application No. 17850054.2 dated Mar. 19, 2021.

* cited by examiner

LIGHT-SPLITTING COMBINED IMAGE COLLECTION DEVICE

The present application claims the priority to a Chinese patent application No. 201610830005.6 filed with the China National Intellectual Property Administration on Sep. 19, 2016 and entitled "LIGHT-SPLITTING COMBINED IMAGE COLLECTION DEVICE", which is incorporated herein by reference in its entirety.

TECHNICAL FIELD

The present application relates to the field of image processing technologies, and in particular, to an image collection device for light splitting and fusion.

BACKGROUND

In a low illumination scenario, in order to ensure that a collected image covers more image information, an image collection device for light splitting and fusion is usually required to collect an image. Specifically, the basic principle for collecting an image through the image collection device for light splitting and fusion is: collecting a visible light image corresponding to a visible light and collecting a non-visible light image corresponding to a non-visible light, and fusing the visible light image and the non-visible light image to obtain a fused image. The fused image is a dual-band image exhibiting more image information than any one of a visible light image and a non-visible light image belonging to a single band image. The so-called non-visible light is a near-infrared signal or an infrared signal. Correspondingly, when the non-visible light is a near-infrared signal, the non-visible light image is a near-infrared image, and when the non-visible light is an infrared signal, the non-visible light image is an infrared image.

The image collection device for light splitting and fusion in the related art specifically includes a semi-reflection and semi-permeable mirror, a visible light sensor, an infrared light sensor, a registration unit, and a fusion unit. Specifically, the semi-reflection and semi-permeable mirror is used to split incident light into a visible light and a non-visible light. The visible light sensor is used for sensitising the visible light to form a visible light image, the infrared light sensor is used for sensitising the non-visible light to form a non-visible light image. The registration unit is used for eliminating a position deviation between the non-visible light image and the visible light image. The fusion unit is used for performing weighting fusion on the position-corrected non-visible light image and the position-corrected visible light image formed by the registration unit, wherein the image obtained after fusion is an output image of the image collection device.

During the research process, the inventor found that, since the fusion unit of the image collection device in the related art directly performs weighting fusion on the position-corrected non-visible light image and the position-corrected visible light image formed by the registration unit, the image difference due to different light wave reflection characteristics of an object for different bands is ignored, which causes a color distortion of the fused image.

SUMMARY

The object of the embodiments of the present application is to provide an image collection device for light splitting and fusion, in order to improve the color accuracy of the fused image. The specific technical solutions are as follows.

In a first aspect, an embodiment of the present application provides an image collection device for light splitting and fusion, including:

a light splitter, a visible spectrum imaging module, a non-visible spectrum imaging module, a registration unit, a pre-processing synthesizing unit, and a fusion unit.

The light splitter is configured to split incident light into a visible light and a non-visible light.

The visible spectrum imaging module is configured to perform photosensitive imaging according to the visible light split by the light splitter to form a first visible light image.

The non-visible spectrum imaging module is configured to perform photosensitive imaging according to the non-visible light split by the light splitter to form a first non-visible light image.

The registration unit is configured to perform position registration on the first visible light image and the first non-visible light image to obtain a target visible light image and a second non-visible light image.

The pre-processing synthesizing unit is configured to perform brightness adjustment on the second non-visible light image to obtain a target non-visible light image.

The fusion unit is configured to perform image fusion on the target visible light image and the target non-visible light image to obtain a fused image.

Optionally, the pre-processing synthesizing unit is specifically configured to perform brightness adjustment on the second non-visible light image based on the target visible light image to obtain the target non-visible light image.

Optionally, the pre-processing synthesizing unit is specifically configured to:

perform color space conversion on the target visible light image to obtain a brightness component of the target visible light image;

calculate a first mean value and a first variance of the brightness component, and a second mean value and a second variance of a brightness component of the second non-visible light image, respectively;

perform global mapping processing on the brightness component of the second non-visible light image based on the first mean value, the first variance, the second mean value, and the second variance;

convolve the target visible light image and the second non-visible light image respectively by using a preset sobel edge detection operator to obtain a first texture image corresponding to the target visible light image and a second texture image corresponding to the second non-visible light image.

perform brightness adjustment on the second non-visible light image to determine the target non-visible light image by using a brightness component obtained after the global mapping processing, the brightness component of the target visible light image, the first texture image, and the second texture image.

Optionally, a formula used by the pre-processing synthesizing unit to performing global mapping processing on the brightness component of the second non-visible light image is:

$$y'_N = \frac{\sigma_D}{\sigma_N}(y_N - \mu_N) + \mu_D$$

wherein, $y_N'$ represents the brightness component obtained after the global mapping processing, $y_N$ represents the brightness component of the second non-visible light image, $\mu_D$ represents the first mean value, $\mu_N$ represents the second mean value, and $\sigma_D$ represents the first variance, $\sigma_N$ represents the second variances.

The preset sobel edge detection operator used by the pre-processing synthesizing unit is:

$$sobel_{horizontal} = \begin{bmatrix} -1 & -2 & -1 \\ 0 & 0 & 0 \\ 1 & 2 & 1 \end{bmatrix}, sobel_{vertical} \begin{bmatrix} -1 & 0 & 1 \\ -2 & 0 & 2 \\ -1 & 0 & 1 \end{bmatrix}$$

A formula used by the pre-processing synthesizing unit to perform brightness adjustment on the second non-visible light image is:

$$y_{AP} = \frac{y_N' * t_N + y_D * t_D}{t_N + t_D}$$

wherein, $y_{AP}$ represents the target non-visible light image, $y_N'$ represents the brightness component obtained after the global mapping processing, $y_D$ represents the brightness component of the target visible light image, $t_N$ represents the second texture image, and $t_D$ represents the first texture image.

Optionally, the fusion unit is specifically configured to:
perform weighting processing on the target visible light image and the target non-visible light image according to a corresponding first type of weight value to obtain a fused image.

Optionally, the fusion unit is specifically configured to:
perform frequency division fusion on the target visible light image and the target non-visible light image to obtain a fused image.

Optionally, the process of performing frequency division fusion on the target visible light image and the target non-visible light image by the fusion unit includes:
performing color space conversion on the target visible light image to obtain a brightness component and a color component of the target visible light image;
performing low-pass filtering on the brightness component to obtain low frequency information of the target visible light image;
performing high-pass filtering on the target non-visible light image to obtain high frequency information of the target non-visible light image;
performing weighting processing on the low frequency information and the high frequency information according to a corresponding second type of weight value to obtain a brightness component corresponding to a fused image to be formed;
combining the brightness component corresponding to the fused image to be formed and the color component of the target visible light image to obtain the fused image.

Optionally, a formula used by the fusion unit to perform weighting processing on the low frequency information and the high frequency information according to the corresponding second type of weight value is:

$$y_{Fus} = w * y_{low} + (1-w) * y_{AP} + K * y_{high}$$

wherein, $y_{Fus}$ represents the brightness component corresponding to the fused image to be formed, $y_{AP}$ represents the target non-visible light image, $y_{low}$ represents the low frequency information, $y_{high}$ represents the high frequency information, w represents the second type of weight value corresponding to the low frequency information, K represents the second type of weight value corresponding to the high frequency information.

Optionally, w is determined according to a brightness difference between the brightness components of the target non-visible light image and the target visible light image, wherein $$w = \frac{abs(y_{AP} - y_D)}{\max(abs(y_{AP} - y_D))}$$

wherein, $y_{AP}$ represents the target non-visible light image, $y_D$ represents the brightness component of the target visible light image, $abs(y_{AP}-y_D)$ represents the absolute value of $(y_{AP}-y_D)$, $\max(abs(y_{AP}-y_D))$ represented the maximum value of $abs(y_{AP}-y_D)$.

Optionally, the visible spectrum imaging module is placed at 90° with respect to the non-visible spectrum imaging module, and a reflective surface of the light splitter is at 45° with respect to the incident light.

Optionally, the image collection device provided by the embodiment of the present application further includes an illumination module.

The illumination module is configured to perform infrared illumination on the non-visible spectrum imaging module.

Optionally, the non-visible spectrum imaging module is further configured to send a illumination signal to the illumination module when detecting that the first non-visible light image formed itself meets a predetermined illumination condition.

The illumination module is specifically configured to perform infrared illumination on the non-visible spectrum imaging module after receiving the illumination signal.

Optionally, the predetermined illumination condition is:
a signal to noise ratio of the first non-visible light image being lower than a predetermined threshold;
or,
a gain level during an automatic exposure processing when the first non-visible light image is imaged being lower than a predetermined level.

An embodiment of the present application further provides an electronic device, including: a housing, a processor, a memory, a circuit board, a power supply circuit, a light splitter, a visible spectrum imaging module, and a non-visible spectrum imaging module, wherein the circuit board and the light splitter are disposed within a space enclosed by the housing, the processor, the memory, the visible spectrum imaging module and the non-visible spectrum imaging module are disposed on the circuit board.

The power supply circuit is configured to supply power to each circuit or component.

The light splitter is configured to split incident light into a visible light and a non-visible light.

The visible spectrum imaging module is configured to perform photosensitive imaging according to the visible light split by the light splitter to form a first visible light image.

The non-visible spectrum imaging module is configured to perform photosensitive imaging according to the non-visible light split by the light splitter to form a first non-visible light image.

The memory is configured to store executable program codes.

The processor performs the following steps by running executable program codes stored in the memory:

performing position registration on the first visible light image and the first non-visible light image to obtain a target visible light image and a second non-visible light image;

performing brightness adjustment on the second non-visible light image to obtain a target non-visible light image;

performing image fusion on the target visible light image and the target non-visible light image to obtain a fused image.

Optionally, the step of performing brightness adjustment on the second non-visible light image to obtain the target non-visible light image includes:

performing brightness adjustment on the second non-visible light image based on the target visible light image to obtain the target non-visible light image.

Optionally, the step of performing brightness adjustment on the second non-visible light image based on the target visible light image to obtain the target non-visible light image includes:

performing color space conversion on the target visible light image to obtain a brightness component of the target visible light image;

calculating a first mean value and a first variance of the brightness component, and a second mean value and a second variance of a brightness component of the second non-visible light image, respectively;

performing global mapping processing on the brightness component of the second non-visible light image based on the first mean value, the first variance, the second mean value, and the second variance;

convolving the target visible light image and the second non-visible light image respectively by using a preset sobel edge detection operator to obtain a first texture image corresponding to the target visible light image and a second texture image corresponding to the second non-visible light image;

performing brightness adjustment on the second non-visible light image to determine the target non-visible light image by using a brightness component obtained after the global mapping processing, the brightness component of the target visible light image, the first texture image, and the second texture image.

Optionally, a formula used in the step of performing global mapping processing on the brightness component of the second non-visible light image is:

$$y'_N = \frac{\sigma_D}{\sigma_N}(y_N - \mu_N) + \mu_D$$

wherein, $y_N'$ represents the brightness component obtained after the global mapping process, $y_N$ represents the brightness component of the second non-visible light image, $\mu_D$ represents the first mean value, $\mu_N$ represents the second mean value, and $\sigma_D$ represents the first variance, $\sigma_N$ represents the second variances.

The preset sobel edge detection operator is:

$$sobel_{horizontal} = \begin{bmatrix} -1 & -2 & -1 \\ 0 & 0 & 0 \\ 1 & 2 & 1 \end{bmatrix}, sobel_{vertical} = \begin{bmatrix} -1 & 0 & 1 \\ -2 & 0 & 2 \\ -1 & 0 & 1 \end{bmatrix}$$

A formula used in the step of performing brightness adjustment on the second non-visible light image is:

$$y_{AP} = \frac{y'_N * t_N + y_D * t_D}{t_N + t_D}$$

wherein, $y_{AP}$ represents the target non-visible light image, $y_N'$ represents the brightness component obtained after the global mapping processing, $y_D$ represents the brightness component of the target visible light image, $t_N$ represents the second texture image, and $t_D$ represents the first texture image.

Optionally, the step of performing image fusion on the target visible light image and the target non-visible light image to obtain a fused image includes:

performing weighting processing on the target visible light image and the target non-visible light image according to a corresponding first type of weight value to obtain a fused image.

Optionally, the step of performing image fusion on the target visible light image and the target non-visible light image to obtain a fused image includes:

performing frequency division fusion on the target visible light image and the target non-visible light image to obtain a fused image.

Optionally, the step of performing frequency division fusion on the target visible light image and the target non-visible light image to obtain a fused image includes:

performing color space conversion on the target visible light image to obtain a brightness component and a color component of the target visible light image;

performing low-pass filtering on the brightness component to obtain low frequency information of the target visible light image;

performing high-pass filtering on the target non-visible light image to obtain high frequency information of the target non-visible light image;

performing weighting processing on the low frequency information and the high frequency information according to a corresponding second type of weight value to obtain a brightness component corresponding to a fused image to be formed;

combining the brightness component corresponding to the fused image to be formed and the color component of the target visible light image to obtain the fused image.

Optionally, a formula used in the step of performing weighting processing on the low frequency information and the high frequency information according to the corresponding second type of weight value is:

$$y_{Fus} = w * y_{low} + (1-w) * y_{AP} + K * y_{high}$$

wherein, $y_{Fus}$ represents the brightness component corresponding to the fused image to be formed, $y_{AP}$ represents the target non-visible light image, $y_{low}$ represents the low frequency information, $y_{high}$ represents the high frequency information, w represents the second type of weight value corresponding to the low frequency information, K represents the second type of weight value corresponding to the high frequency information.

Optionally, w is determined according to a brightness difference between the brightness components of the target non-visible light image and the target visible light image, wherein $$w = \frac{\text{abs}(y_{AP} - y_D)}{\max(\text{abs}(y_{AP} - y_D))}$$

wherein, $y_{AP}$ represents the target non-visible light image, $y_D$ represents the brightness component of the target visible light image, $\text{abs}(y_{AP}-y_D)$ represents the absolute value of $(y_{AP}-y_D)$, $\max(\text{abs}(y_{AP}-y_D))$ represented the maximum value of $\text{abs}(y_{AP}-y_D)$.

Optionally, the visible spectrum imaging module is placed at 90° with respect to the non-visible spectrum imaging module, and a reflective surface of the light splitter is at 45° with respect to the incident light.

Optionally, the electronic device further includes: an illumination module.

The illumination module is configured to perform infrared illumination on the non-visible spectrum imaging module.

Optionally, the non-visible spectrum imaging module is further configured to send a illumination signal to the illumination module when detecting that the first non-visible light image formed itself meets a predetermined illumination condition.

The illumination module is specifically configured to perform infrared illumination on the non-visible spectrum imaging module after receiving the illumination signal.

Optionally, the predetermined illumination condition is:

a signal to noise ratio of the first non-visible light image being lower than a predetermined threshold;

or, a gain level during an automatic exposure processing when the first non-visible light image is imaged being lower than a predetermined level.

In the image collection device for light splitting and fusion provided by the embodiments of the present application, the light splitter splits the incident light into a visible light and a non-visible light. The visible spectrum imaging module performs photosensitive imaging according to the visible light split by the light splitter to form a first visible light image. The non-visible spectrum imaging module performs photosensitive imaging according to the non-visible light split by the light splitter to form a first non-visible light image. The registration unit is configured to perform position registration on the first visible light image and the first non-visible light image to obtain a target visible light image and a second non-visible light image. The pre-processing synthesizing unit performs brightness adjustment on the second non-visible light image to obtain a target non-visible light image; and the fusion unit performs image fusion on the target visible light image and the target non-visible light image to obtain a fused image. Compared with the related art, a pre-processing synthesizing unit is added in the present solution, and after pre-processing synthesizing unit performs brightness adjustment on the second non-visible light image, the fusion unit performs image fusion on the target non-visible light image whose brightness has been adjusted and the target visible light image. In this way, the image difference due to different light wave reflection characteristics of an object for different bands is considered, thus the color accuracy of the fused image can be improved.

BRIEF DESCRIPTION OF THE DRAWINGS

In order to illustrate the technical solutions of the embodiments of the present application and the related art more clearly, the drawings used in the embodiments and the related art will be briefly described below. It is obvious that the drawings in the following description are only for some embodiments of the present application, other drawings may be obtained by those skilled in the art without any creative efforts based on these figures.

DETAILED DESCRIPTION OF THE INVENTION

The technical solutions in the embodiments of the present application are clearly and completely described in the following with reference to the drawings of the embodiments of the present application. It is obvious that the described embodiments are only a part of the embodiments of the present application, and not all of the embodiments. All other embodiments obtained by a person of ordinary skill in the art based on the embodiments of the present application without any creative efforts fall in the protection scope of the present application.

In order to improve the accuracy of the color of a fused image in a low illumination scenario, an embodiment of the present application provides an image collection device for light splitting and fusion. The image collection device for light splitting and fusion can be a camera for light splitting and fusion and any other reasonable devices.

Figure 1:
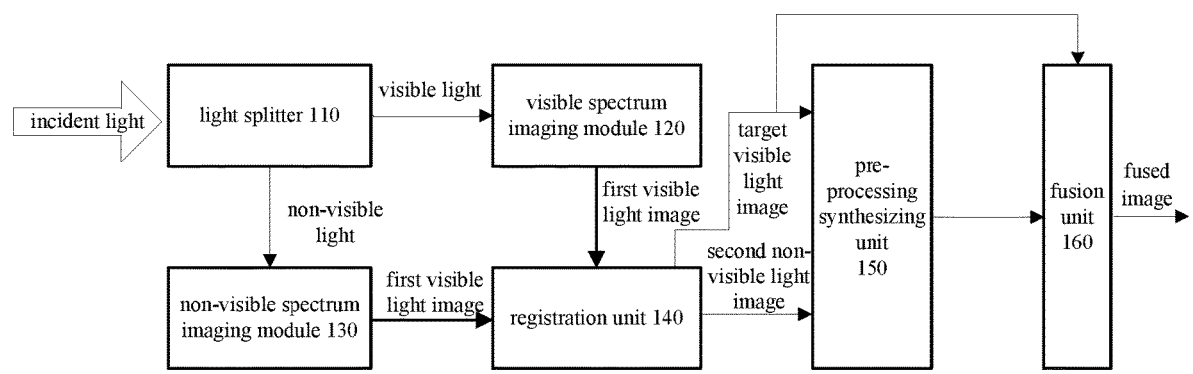
FIG. 1 is a schematic structural diagram of an image collection device for light splitting and fusion provided by an embodiment of the present application.

As shown in FIG. 1, the embodiment of the present application provides an image collection device for light splitting and fusion, which may include:

a light splitter 110, a visible spectrum imaging module 120, a non-visible spectrum imaging module 130, a registration unit 14, a pre-processing synthesizing unit 150, and a fusion unit 160.

The light splitter 110 is configured to split incident light into a visible light and a non-visible light.

The visible spectrum imaging module 120 is configured to perform photosensitive imaging according to the visible light split by the light splitter 110 to form a first visible light image.

The non-visible spectrum imaging module 130 is configured to perform photosensitive imaging according to the non-visible light split by the light splitter 110 to form a first non-visible light image.

The registration unit 140 is configured to perform position registration on the first visible light image and the first non-visible light image to obtain a target visible light image and a second non-visible light image.

The pre-processing synthesizing unit 150 is configured to perform brightness adjustment on the second non-visible light image to obtain a target non-visible light image.

The fusion unit 160 is configured to perform image fusion on the target visible light image and the target non-visible light image to obtain a fused image.

It can be understood that the illumination module 170 can illuminate in real time to ensure sufficient non-visible light. Of course, in order to effectively illuminate, the non-visible spectrum imaging module 130 is further configured to send a illumination signal to the illumination module when detecting that the first non-visible light image formed itself meets a predetermined illumination condition. The illumination module 170 is specifically configured to perform non-visible illumination on the non-visible spectrum imaging module 130 after receiving the illumination signal, that is, the illumination module 170 has an adaptive switching function. Of course, the non-visible spectrum imaging module 130 can also determine a illumination intensity of the required illumination, thereby instructing the illumination module 170 to illuminate according to the illumination intensity. At this time, the illumination module 170 has an adaptive switch/intensity control function.

The light splitter 110 is disposed behind the lens of the image collection device to split the incident light entering the lens. In addition, it can be understood that, from the perspective of input and output, the input of the light splitter 110 is the incident light and the output is visible light and non-visible light. Moreover, in order to realize splitting the incident light into a visible light and a non-visible light, the light splitter 110 may be a semi-reflection and semi-permeable mirror that transmits visible light and reflects non-visible light. Specifically, the specific product form of the semi-reflection and semi-permeable mirror may be, but not limited to, a light splitting prism; wherein, those skilled in the art can understand that the light splitting prism can allow visible light to pass through but cut off or reflect non-visible light. That is, the incident light passing through the reflecting surface of the prism is filtered out the non-visible band (the filtered non-visible light can be reflected), and the visible light is passed. In addition, for the light splitting prism, the range of visible light band that can pass through the prism can be controlled by adjusting the thickness of the prism coating, and the specific control method is related technology, and will not be described here. In addition, on the premise that the splitting processing of the incident light can be ensured, the manner of disposing the light splitter 110 in the embodiment of the present application may not be limited. For example, the light splitter 110 may be disposed in a fixed manner or in a moveable manner. It can be understood that if the light splitter 110 is disposed in a moveable manner, the update frequency of a subsequent registration matrix would be higher, resulting in a larger amount of calculation. Therefore, in order to perform one time offline calibration registration matrix, the light splitter 110 can be disposed in a fixed manner.

It should be noted that the visible spectrum imaging module 120 may be any device capable of imaging visible light in the related art, and subjected to automatic exposure, white balance, gamma mapping, etc. during imaging. For example, the visible spectrum imaging module 120 may be a visible light image sensor. Similarly, the non-visible spectrum imaging module 130 may be any device in the related art capable of imaging non-visible light, and subjected to automatic exposure, white balance, gamma mapping, etc. during imaging. For example, the non-visible spectrum imaging module may be a non-visible light image sensor. Moreover, since the visible spectrum imaging module 120 and the non-visible spectrum imaging module 130 are not the inventive points of the present application, the specific form of the visible spectrum imaging module 120 and the non-visible spectrum imaging module 130 is not limited herein, and the specific imaging principle is not described.

In addition, the registration unit 140 is configured to eliminate a position deviation between the first non-visible light image and the first visible light image, thereby avoiding problems such as misalignment and ghosting during subsequent processing. As an implementation of the present application, a mathematical model of horizontal mirroring and affine transformation can be used to simulate the image distortion problem during light splitting process, thereby eliminating the position deviation, wherein correlation coefficients of the registration matrix required for the affine transformation processing can be obtained by offline calibration. It can be understood that, in the target visible light image and the second non-visible light image obtained by the registration unit 140 performing the position registration on the first visible light image and the first non-visible light image, position shift may or may not occur to the target visible light image with respect to the first visible light image. The position shift may or may not occur to the second non-visible light image with respect to the first non-visible light image. Moreover, in position registration, the first visible light image may be taken as reference, and position registration is performed on the first non-visible light image. The first non-visible light image may also be taken as reference, and position registration is performed on the first visible light image. It should be noted that registration manners in the related art can be adopted for the specific registration manner of the registration unit 140. For the sake of clear layout, the registration manner is introduced later.

It can be understood that, since the photosensitive bands of the visible spectrum imaging module 120 and the non-visible spectrum imaging module 130 are different, brightness difference of the imaging is easily caused. In addition, the degree of the brightness difference affects the color accuracy. In order to improve the accuracy of the color of the fused image, the brightness of the second non-visible light image can be changed to reduce the difference in brightness of the two images to be fused. Based on this concept, a pre-processing synthesizing unit 150 is added in the image collection device for light splitting and fusion provided by the embodiment of the present application, compared to the related art. It can be understood that there are various implementations for the pre-processing synthesizing unit 150 to perform the brightness adjustment on the second non-visible light image. For the sake of clear layout, an example will be described later.

It can be understood by those skilled in the art that since there are two types of images, i.e. the target visible light image and the target non-visible light image, the fusion unit 160 can perform image fusion on the target visible light image and the target non-visible light image to obtain a fused image. The fused image is a dual-band image, which represents more image information than any one of the target visible light image and the target non-visible light image belonging to a single-band image. It can be understood that there are various implementations for the fusion unit 160 to perform the image fusion on the target visible light image and the target non-visible light image. For the sake of clear layout, an example will be described later.

It should be emphasized that the "first" in the "first non-visible light image", the "second" in the "second non-visible light image" and the "target" in the "target non-visible light image" in the embodiment of the present application are only used to distinguish the non-visible light image in different processing stages in terms of names, and do not have any limiting meaning. Similarly, the "first" in the "first visible light image" and the "target" in the "target visible light image" also do not have any limiting meaning.

In the image collection device for light splitting and fusion provided by the embodiment of the present application, the light splitter splits the incident light into a visible light and a non-visible light. The visible spectrum imaging module performs photosensitive imaging according to the visible light split by the light splitter to form a first visible light image. The non-visible spectrum imaging module performs photosensitive imaging according to the non-visible light split by the light splitter to form a first non-visible light image. The registration unit is configured to perform position registration on the first visible light image and the first non-visible light image to obtain a target visible light image and a second non-visible light image. The pre-processing synthesizing unit performs brightness adjustment on the second non-visible light image to obtain a target non-visible light image; and the fusion unit performs image fusion on the target visible light image and the target non-visible light image to obtain a fused image. Compared with the related art, a pre-processing synthesizing unit is added in the present solution, and after the pre-processing synthesizing unit performs brightness adjustment on the second non-visible light image, image fusion is performed on the target non-visible light image whose brightness has been adjusted and the target visible light image. In this way, the image difference due to different light wave reflection characteristics of an object for different bands is considered, thus the color accuracy of the fused image can be improved.

Specifically, there are various implementations for the pre-processing synthesizing unit 150 to perform brightness adjustment on the second non-visible light image, which are described hereinafter by way of examples.

In an implementation, the pre-processing synthesizing unit 150 can perform brightness adjustment on the second non-visible light image based on a preset brightness parameter value or a preset brightness adjustment value.

It can be understood that, for the manner of adjusting the brightness of the second non-visible light image based on the preset brightness parameter value, a brightness parameter value of the target non-visible light image is the preset brightness parameter value. That is, the brightness parameter value of the second non-visible light image is adjusted to the preset brightness parameter value. For the manner of adjusting the brightness of the second non-visible light image based on the preset brightness adjustment value, the brightness parameter value of the target non-visible light image is the sum of the preset brightness adjustment value and the brightness parameter value of the second non-visible light image. That is, the brightness parameter value of the second non-visible light image is adjusted by the preset brightness adjustment value which is an increment value. In addition, it should be emphasized that both the preset brightness parameter value and the preset brightness adjustment value are empirical values, and the empirical values are obtained based on the brightness difference between the image formed by the visible spectrum imaging module 120 and the image formed by the non-visible spectrum imaging module 130.

In another implementation, the pre-processing synthesizing unit 150 can perform brightness adjustment on the second non-visible light image based on the target visible light image. It should be emphasized that there are various implementations for the pre-processing synthesis unit 150 to perform the brightness adjustment on the second non-visible light image based on the target visible light image, which are described hereinafter by way of examples.

In a specific implementation, the pre-processing synthesizing unit 150 is specifically configured to perform the following steps.

Step a1, performing color space conversion on the target visible light image to obtain a brightness component of the target visible light image.

It will be understood by those skilled in the art that commonly used color space types are RGB (red, green, and blue color model), CMYK (print color model depending on reflections), and Lab (based on human perception of color, constituted by three elements of luminance (L) and a, b related to colors), HSV (Hue, Saturation, Value, specifically, the parameters of color in this model are: hue (H), saturation (S), value (V)), etc. The process of performing color space conversion on the target visible light image to obtain a brightness component of the target visible light image is to convert the target visible light image from the currently associated color space model to a color space model containing brightness, thereby separating the brightness component. Specifically, the conversion manner can refer to conversion manners between color space models of the related art, which is not limited herein.

Step b1, calculating a first mean value and a first variance of the brightness component, and a second mean value and a second variance of a brightness component of the second non-visible light image respectively;

Since the second non-visible light image itself does not involve color component, it is not necessary to perform the brightness component separation process. Therefore, after the brightness component of the target visible light image is obtained by separating, the first mean value and the first variance of the brightness component as well as the second mean value and the second variance of the brightness component of the second non-visible light image may be respectively calculated by using a related technique, thereby subsequent processing can be performed.

Step c1: performing global mapping processing on the brightness component of the second non-visible light image based on the first mean value, the first variance, the second mean value, and the second variance.

Specifically, in an implementation, the formula used by the pre-processing synthesizing unit 150 to perform global mapping processing on the brightness component of the second non-visible light image may be:

$$y'_N = \frac{\sigma_D}{\sigma_N}(y_N - \mu_N) + \mu_D$$

wherein, $y_N'$ represents a brightness component obtained after the global mapping processing, $y_N$ represents the brightness component of the second non-visible light image, $\mu_D$ represents the first mean value, $\mu_N$ represents the second mean value, and $\sigma_D$ represents the first variance, $\sigma_N$ represents the second variances.

Step d1: convolving the target visible light image and the second non-visible light image respectively by using a preset sobel edge detection operator to obtain a first texture image corresponding to the target visible light image and a second texture image corresponding to the second non-visible light image.

The sobel edge detection operator is mainly used for edge detection. Technically, it is a discrete difference operator that is used to calculate an approximation of gray level of the image brightness function. Using this operator at any point in an image will produce a corresponding gray vector or its normal vector.

Specifically, in an implementation, the preset sobel edge detection operator used by the pre-processing synthesizing unit 150 is:

$$sobel_{horizontal} = \begin{bmatrix} -1 & -2 & -1 \\ 0 & 0 & 0 \\ 1 & 2 & 1 \end{bmatrix}, sobel_{vertical} = \begin{bmatrix} -1 & 0 & 1 \\ -2 & 0 & 2 \\ -1 & 0 & 1 \end{bmatrix}$$

It can be understood that the specific implementation of convolving the target visible light image and the second non-visible light image by using a preset sobel edge detection operator can be referred to the related art, which is not limited herein.

Step e1: performing brightness adjustment on the second non-visible light image to determine a target non-visible light image by using the brightness component obtained after the global mapping processing, the brightness component of the target visible light image, the first texture image, and the second texture image.

In a specific implementation, the formula used by the pre-processing synthesizing unit 150 to adjust the brightness of the second non-visible light image may be:

$$y_{AP} = \frac{y'_N * t_N + y_D * t_D}{t_N + t_D}$$

wherein, $y_{AP}$ represents the target non-visible light image, $y_N'$ represents the brightness component obtained after the global mapping processing, $y_D$ represents the brightness component of the target visible light image, $t_N$ represents the second texture image, and $t_D$ represents the first texture image.

It should be emphasized that the formula used by the pre-processing synthesizing unit 150 to perform the global mapping processing on the brightness component of the second non-visible light image, and the formula used by the pre-processing synthesizing unit 150 to perform the brightness adjustment on the second non-visible light image are merely examples, which should not be construed as limitations to the embodiments of the present application. Moreover, the above specific implementation of the brightness adjustment of the second non-visible light image based on the target visible light image is only an example, and should not be construed as limitations to the embodiments of the present application.

Specifically, there are various implementations for the fusion unit 160 to perform image fusion on the target visible light image and the target non-visible light image, which are described hereinafter by way of examples.

In a specific implementation, the fusion unit 160 is specifically configured to:

perform weighting processing on the target visible light image and the target non-visible light image according to a corresponding first type of weight value to obtain a fused image.

It should be noted that, in this implementation, weight values corresponding to the target visible light image and the target non-visible light image are referred to as the first type of weight value, wherein the first type of weight value corresponding to the target visible light image and the first type of weight value corresponding to the non-visible light image may be the same or different, but the sum of the two first type of the weight values is 1. Moreover, performing weighting processing on the target visible light image and the target non-visible light image according to a corresponding first type of weight value specifically refers to multiplying the target visible light image and the target non-visible light image by the corresponding first type of weight value and adding the products. For example: $y=x_1*A+x_2*B$, y is the fused image, A is the target visible light image, B is the target non-visible light image, and $x_1$ is the first type of weight value corresponding to the target visible light image, and $x_2$ is the first type of weight value corresponding to the target non-visible light image.

It can be understood that the first type of weight value corresponding to the target visible light image and the first type of weight value corresponding to the target non-visible light image may be preset values. They may be set based on actual information requirements of the target visible light image and the target non-visible light image, which is not limited herein. For example, when it needs more image information of the target visible light image than the image information of the target non-visible light image, the first type of weight value corresponding to the target visible light image may be set to be greater than the first type of weight value corresponding to the target non-visible light image. Similarly, when it needs less image information of the target visible light image than the image information of the target non-visible light image, the first type of weight value corresponding to the target visible light image may be set to be smaller than the first type of weight value corresponding to the target non-visible light image. The process of performing the weighting processing on the target visible light image and the target non-visible light image according to the corresponding first type of weight value may adopt techniques in the related art, which is not described herein.

In another specific implementation, in order to improve image details, information volume, and color accuracy, the fusion unit 160 is specifically configured to:

perform frequency division fusion on the target visible light image and the target non-visible light image to obtain a fused image.

The basic idea of the so-called frequency division fusion is extracting low frequency information of the target visible light image and high frequency information of the target non-visible light image, performing weighting fusion according to a certain weight, combining a fused brightness and color components of visible light, and outputting a colored fused image.

Figure 2:
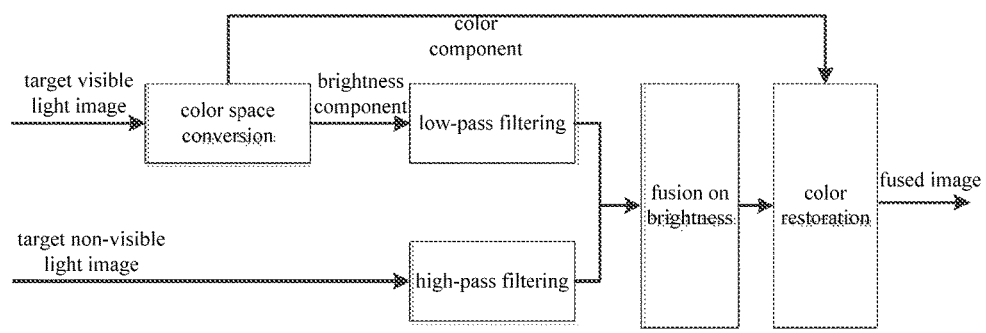
FIG. 2 is a diagram showing the fusion principle of a fusion unit provided by an embodiment of the present application.

Specifically, in an implementation, as shown in FIG. 2, the process of performing frequency division fusion on the target visible light image and the target non-visible light image performed by the fusion unit 160 may include:

Step a2, performing color space conversion on the target visible light image to obtain a brightness component and a color component of the target visible light image.

It will be understood by those skilled in the art that commonly used color space types are RGB (red, green, and blue color model), CMYK (print color model depending on reflections), and Lab (based on human perception of color, constituted by three elements of luminance (L) and a, b related to colors), HSV (Hue, Saturation, Value, specifically, the parameters of color in this model are: hue (H), saturation (S), value (V)), etc. The process of performing color space conversion on the target visible light image to obtain a brightness component and a color component of the target visible light image is to convert the target visible light image from the currently associated color space model to a color space model containing brightness and color components, thereby separating the brightness component and the color component. Specifically, the conversion manner can refer to conversion manners between the color space models in the related art, which is not limited herein.

Step b2: performing low-pass filtering on the brightness component to obtain low frequency information of the target visible light image.

After obtaining the brightness component, low-pass filtering can be performed on the brightness component using related low-pass filtering techniques, to obtain low frequency information of the target visible light image.

Step c2: performing high-pass filtering on the target non-visible light image to obtain high frequency information of the target non-visible light image.

Since the target non-visible light image itself does not involve a color component, it is not necessary to perform a brightness component separation process. Therefore, high-pass filtering can be directly performed on the target non-visible light image by using a related high-pass filtering techniques to obtain high frequency information of the target non-visible light image.

Step d2: performing weighting processing on the low frequency information and the high frequency information according to a corresponding second type of weight value to obtain a brightness component corresponding to a fused image to be formed.

After obtaining the low frequency information of the target visible light image and the high frequency information of the target non-visible light image, the low frequency information and the high frequency information may be weighted according to the corresponding second type of weight value to obtain a brightness component corresponding to a fused image to be formed.

Specifically, in an implementation, the formula used by the fusion unit 160 to perform weighting processing on the low frequency information and the high frequency information according to the corresponding second type of weight value may be:

$$y_{Fus} = w*y_{low} + (1-w)*y_{AP} + K*y_{high}$$

wherein, $y_{Fus}$ represents the brightness component corresponding to the fused image to be formed, $y_{AP}$ represents the target non-visible light image, $y_{low}$ represents the low frequency information, $y_{high}$ represents the high frequency information, w represents the second type of weight value corresponding to the low frequency information, K represents the second type of weight value corresponding to the high frequency information.

Specifically, in this implementation, w and K may be the same or different. w can be a value set manually, or can be automatically determined, where the value of w indicates the required image information of the target visible light image, and the larger the w is, the more image information is required. If w is determined automatically, w can be determined according to a brightness difference between the brightness components of the target non-visible light image and the target visible light image, wherein the formula for determining w is:

$$w = \frac{abs(y_{AP} - y_D)}{max(abs(y_{AP} - y_D))}$$

wherein, $y_{AP}$ represents the target non-visible light image, $y_D$ represents the brightness component of the target visible light image, $abs(y_{AP}-y_D)$ represents the absolute value of $(y_{AP}-y_D)$, $max(abs(y_{AP}-y_D))$ represents the maximum value of $abs(y_{AP}-y_D)$.

In addition, K represents the degree of image definition, which can be set manually, and usually the range can be 0 to 5, where 1 means normal, 0 means all image information is low frequency information, and the definition is low.

Step e2: combining the brightness component corresponding to the fused image to be formed and the color component of the target visible light image to obtain the fused image.

After obtaining the brightness component corresponding to the fused image to be formed, the brightness component corresponding to the fused image to be formed and the color component of the target visible light image can be combined using a related technique to obtain the fused image, and the specific combination method is not limited here.

It should be emphasized that the process of performing frequency division fusion on the target visible light image and the target non-visible light image by the fusion unit 160 is only an example, and should not be construed as limitations to the embodiments of the present application.

Specifically, the registration unit 140 can use registration techniques in the related art. For example, the registration unit 140 is specifically configured to:

perform a horizontal mirroring processing on the first non-visible light image based on the first visible light image.

The second non-visible light image can be obtained by performing an affine transformation processing on the first non-visible light image after the horizontal mirroring processing according to the following formula, wherein the registration matrix is calibrated offline based on a positional relationship between the light splitter 110 and two imaging components (ie, the visible spectrum imaging module 120 and the non-visible spectrum imaging module 130):

$$\begin{bmatrix} x' \\ y' \\ z' \end{bmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} x \\ y \\ 1 \end{bmatrix}$$

$$\begin{bmatrix} x1 \\ y1 \\ 1 \end{bmatrix} = \begin{bmatrix} x'/z' \\ y'/z' \\ z'/z' \end{bmatrix}$$

wherein, (x,y) is the coordinates of a pixel point of the second non-visible light image, (x1,y1) is the coordinates of a pixel point of the first non-visible light image, and $$\begin{bmatrix} a_{11} & a_{12} & a_{13} \\ a_{21} & a_{22} & a_{23} \\ a_{31} & a_{32} & a_{33} \end{bmatrix}$$

is the registration matrix obtained by offline calibration.

It should be noted that the specific functions of the above-mentioned registration unit 140 are merely examples and should not be construed as limitations to the embodiments of the present application.

Figure 3:
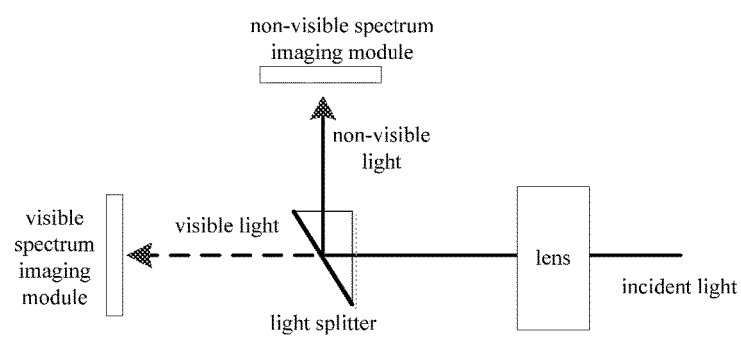
FIG. 3 is a schematic diagram showing a setting position of a light splitter in an image collection device for light splitting and fusion provided by an embodiment of the present application.

In a specific implementation, for a case where the light splitter 110 is disposed in a fixed manner, in order to ensure that the amount of light enters is maximum, the visible spectrum imaging module 120 is placed at 90° with respect to the non-visible spectrum imaging module 130, and the reflective surface of the light splitter is at 45° with respect to the incident light. Specifically, as shown in FIG. 3, the visible spectrum imaging module 120 is placed at 90° with respect to the non-visible spectrum imaging module 130, and the reflective surface of the light splitter is disposed in a fixed manner on a diagonal line formed by the two imaging components, so as to cause the reflective surface of the light splitter 110 forms a 45° angle with respect to the visible spectrum imaging module 120 and the non-visible spectrum imaging module 130 respectively, to ensure that the visible light transmitted by the light splitter 110 and the non-visible light reflected by the light splitter 110 make the two imaging components in an axisymmetric relationship.

Figure 4:
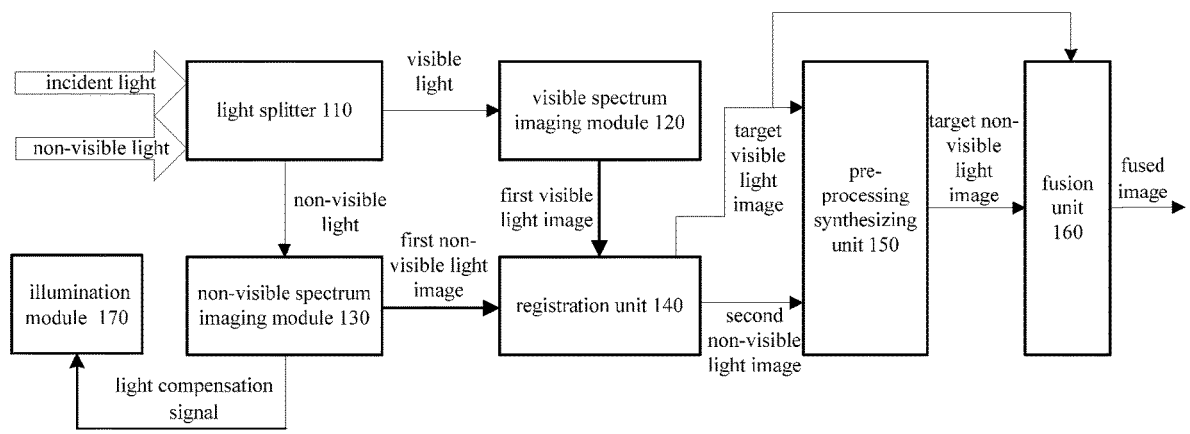
FIG. 4 is a schematic structural diagram of another image collection device for light splitting and fusion provided by an embodiment of the present disclosure.
Figure 5:
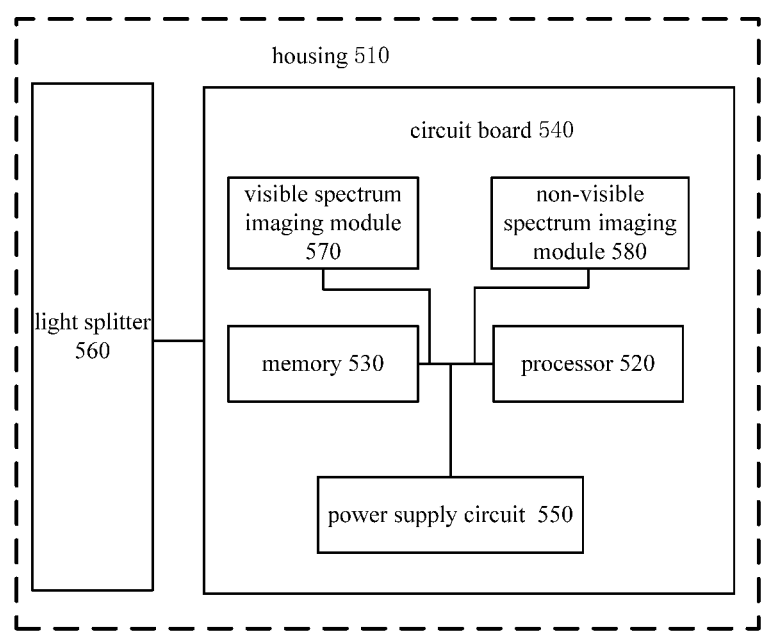
FIG. 5 is a schematic structural diagram of an electronic device provided by an embodiment of the present application.

In a specific implementation, in order to ensure sufficient non-visible light to avoid information deficiency of the fused image caused by the insufficient of non-visible light, as shown in FIG. 4, the image collection device for light splitting and fusion provided by the embodiment of the present application may further include an illumination module 170.

The illumination module 170 is configured to perform non-visible illumination on the non-visible spectrum imaging module 130.

It can be understood that the illumination module 170 can illuminate in real time to ensure sufficient non-visible light. Of course, in order to effectively illuminate, the non-visible spectrum imaging module 130 is further configured to send a illumination signal to the illumination module when detecting that the first non-visible light image formed itself meets a predetermined illumination condition. The illumination module 170 is specifically configured to perform non-visible illumination on the non-visible spectrum imaging module 130 after receiving the illumination signal, that is, the illumination module 170 has an adaptive switching function. Of course, the non-visible spectrum imaging module 130 can also determine a illumination intensity of the required illumination, thereby instructing the illumination module 170 to illuminate according to the illumination intensity. At this time, the illumination module 170 has an adaptive switch/intensity control function. It should be emphasized that the specific manner in which the illumination module 170 performs illumination may be related art, which is not limited herein.

Specifically, the predetermined illumination condition is: a signal to noise ratio of the first non-visible light image being lower than a predetermined threshold; or a gain level during the automatic exposure processing when the first non-visible light image is imaged being lower than a predetermined level. The signal to noise ratio of the first non-visible light image can be calculated by using related techniques. Similarly, the gain level during the automatic exposure processing when the first non-visible light image is imaged can be determined by using related techniques; and, the predetermined threshold and the predetermined level can be empirical values or can be set according to actual situations, which is not limited herein. It should be understood that the predetermined illumination conditions given in the embodiment of the present application are merely examples, and should not be construed as limitations to the embodiments of the present application.

An embodiment of the present application further provides an electronic device, including a housing 510, a processor 520, a memory 530, a circuit board 540, a power supply circuit 550, a light splitter 560, a visible spectrum imaging module 570, and a non-visible spectrum imaging module 580, wherein the circuit board 540 and the light splitter 560 are disposed within a space enclosed by the housing 510, the processor 550, the memory 530, the visible spectrum imaging module 570 and the non-visible spectrum imaging module 580 are disposed on the circuit board 540.

The power supply circuit 550 is configured to supply power to each circuit or component.

The light splitter 560 is configured to split incident light into a visible light and a non-visible light.

The visible spectrum imaging module 570 is configured to perform photosensitive imaging according to the visible light split by the light splitter 560 to form a first visible light image.

The non-visible spectrum imaging module 580 is configured to perform photosensitive imaging according to the non-visible light split by the light splitter 560 to form a first non-visible light image.

The memory 530 is configured to store executable program codes.

The processor 520 performs the following steps by running executable program codes stored in the memory 530:

performing position registration on the first visible light image and the first non-visible light image to obtain a target visible light image and a second non-visible light image;

performing brightness adjustment on the second non-visible light image to obtain a target non-visible light image;

performing image fusion on the target visible light image and the target non-visible light image to obtain a fused image.

In a specific application, the electronic device may specifically be a camera for light splitting and fusion and the like.

Optionally, the step of performing brightness adjustment on the second non-visible light image to obtain the target non-visible light image includes:

performing brightness adjustment on the second non-visible light image based on the target visible light image to obtain the target non-visible light image.

Specifically, the step of performing brightness adjustment on the second non-visible light image based on the target visible light image to obtain the target non-visible light image includes:

performing color space conversion on the target visible light image to obtain a brightness component of the target visible light image;

calculating a first mean value and a first variance of the brightness component, and a second mean value and a second variance of a brightness component of the second non-visible light image, respectively;

performing global mapping processing on the brightness component of the second non-visible light image based on the first mean value, the first variance, the second mean value, and the second variance;

convolving the target visible light image and the second non-visible light image respectively by using a preset sobel edge detection operator to obtain a first texture image corresponding to the target visible light image and a second texture image corresponding to the second non-visible light image;

performing brightness adjustment on the second non-visible light image to determine the target non-visible light image by using a brightness component obtained after the global mapping processing, the brightness component of the target visible light image, the first texture image, and the second texture image.

Optionally, the formula used in the step of performing global mapping processing on the brightness component of the second non-visible light image is:

$$y'_N = \frac{\sigma_D}{\sigma_N}(y_N - \mu_N) + \mu_D$$

wherein, $y_N'$ represents the brightness component obtained after the global mapping processing, $y_N$ represents the brightness component of the second non-visible light image, $\mu_D$ represents the first mean value, $\mu_N$ represents the second mean value, and $\sigma_D$ represents the first variance, $\sigma_N$ represents the second variances.

The preset sobel edge detection operator is:

$$sobel_{horizontal} = \begin{bmatrix} -1 & -2 & -1 \\ 0 & 0 & 0 \\ 1 & 2 & 1 \end{bmatrix}, sobel_{vertical} \begin{bmatrix} -1 & 0 & 1 \\ -2 & 0 & 2 \\ -1 & 0 & 1 \end{bmatrix}$$

The formula used in the step of performing brightness adjustment on the second non-visible light image is:

$$y_{AP} = \frac{y'_N * t_N + y_D * t_D}{t_N + t_D}$$

wherein, $y_{AP}$ represents the target non-visible light image, $y_N'$ represents the brightness component obtained after the global mapping processing, $y_D$ represents the brightness component of the target visible light image, $t_N$ represents the second texture image, and $t_D$ represents the first texture image.

Optionally, in a specific implementation, the step of performing image fusion on the target visible light image and the target non-visible light image to obtain a fused image includes:

performing weighting processing on the target visible light image and the target non-visible light image according to a corresponding first type of weight value to obtain a fused image.

Optionally, in a specific implementation, the step of performing image fusion on the target visible light image and the target non-visible light image to obtain a fused image includes:

performing frequency division fusion on the target visible light image and the target non-visible light image to obtain a fused image.

Optionally, the step of performing frequency division fusion on the target visible light image and the target non-visible light image to obtain a fused image includes:

performing color space conversion on the target visible light image to obtain a brightness component and a color component of the target visible light image;

performing low-pass filtering on the brightness component to obtain low frequency information of the target visible light image;

performing high-pass filtering on the target non-visible light image to obtain high frequency information of the target non-visible light image;

performing weighting processing on the low frequency information and the high frequency information according to a corresponding second type of weight value to obtain a brightness component corresponding to a fused image to be formed;

combining the brightness component corresponding to the fused image to be formed and the color component of the target visible light image to obtain the fused image.

Optionally, the formula used in the step of performing weighting processing on the low frequency information and the high frequency information according to the corresponding second type of weight value is:

$$y_{Fus} = w*y_{low} + (1-w)*y_{AP} + K*y_{high}$$

wherein, $y_{Fus}$ represents the brightness component corresponding to the fused image to be formed, $y_{AP}$ represents the target non-visible light image, $y_{low}$ represents the low frequency information, $y_{high}$ represents the high frequency information, w represents the second type of weight value corresponding to the low frequency information, K represents the second type of weight value corresponding to the high frequency information.

Optionally, w is determined according to a brightness difference between the brightness components of the target non-visible light image and the target visible light image, wherein $$w = \frac{\text{abs}(y_{AP} - y_D)}{\max(\text{abs}(y_{AP} - y_D))}$$

wherein, $y_{AP}$ represents the target non-visible light image, $y_D$ represents the brightness component of the target visible light image, $\text{abs}(y_{AP}-y_D)$ represents the absolute value of $(y_{AP}-y_D)$, $\max(\text{abs}(y_{AP}-y_D))$ represented the maximum value of $\text{abs}(y_{AP}-y_D)$.

Optionally, the visible spectrum imaging module is placed at 90° with respect to the non-visible spectrum imaging module, and a reflective surface of the light splitter is at 45° with respect to the incident light.

Optionally, the electronic device further includes an illumination module. The illumination module is configured to perform infrared illumination on the non-visible spectrum imaging module.

Optionally, the non-visible spectrum imaging module is further configured to send a illumination signal to the illumination module when detecting that the first non-visible light image formed itself meets a predetermined illumination condition.

The illumination module is specifically configured to perform infrared illumination on the non-visible spectrum imaging module after receiving the illumination signal.

Optionally, the predetermined illumination condition is:

a signal to noise ratio of the first non-visible light image being lower than a predetermined threshold; or, a gain level during an automatic exposure processing when the first non-visible light image is imaged being lower than a predetermined level.

In this embodiment, the processor of the electronic device reads executable program codes stored in the memory to run a program corresponding to the executable program codes. The program performs the following steps when executed: performing position registration on the first visible light image and the first non-visible light image to obtain a target visible light image and a second non-visible light image; performing brightness adjustment on the second non-visible light image to obtain a target non-visible light image; and performing image fusion on the target visible light image and the target non-visible image to obtain a fused image. It can be seen that the image difference due to different light wave reflection characteristics of an object for different bands is considered, thus the color accuracy of the fused image can be improved.

It should be emphasized that, for the electronic device embodiment, since the contents it involves are basically similar to the foregoing method embodiment, the description is relatively simple, and the relevant parts can be referred to the description of the method embodiment.

It should be noted that the relationship terms use here, such as "first," "second," and the like are only used to distinguish one entity or operation from another entity or operation, but do not necessarily require or imply that there is actual relationship or order between these entities or operations. Moreover, the terms "include" "comprise" or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the system is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. An image collection device for light splitting and fusion, comprising a processor and a memory, and further comprising:
   a light splitter, a visible spectrum imaging module, a non-visible spectrum imaging module;
   wherein the light splitter is configured to split incident light into a visible light and a non-visible light;
   the visible spectrum imaging module is configured to perform photosensitive imaging according to the visible light split by the light splitter to form a visible light image;
   the non-visible spectrum imaging module is configured to perform photosensitive imaging according to the non-visible light split by the light splitter to form a first non-visible light image;
   the processor is configured to perform following steps:
   performing position registration on the visible light image and the first non-visible light image to obtain a target visible light image and a second non-visible light image;
   performing color space conversion on the target visible light image to obtain a brightness component of the target visible light image; and performing brightness adjustment on the second non-visible light image based on an empirical value obtained based on a difference between the brightness component of the target visible light image and a brightness component of the second non-visible light image to obtain a target non-visible light image;
   performing image fusion on the target visible light image and the target non-visible light image to obtain a fused image;
   wherein the image collection device further comprises a light illumination module that is configured to perform infrared illumination on the non-visible spectrum imaging module;
   wherein the non-visible spectrum imaging module is further configured to send an illumination signal to the light illumination module when detecting that the first non-visible light image formed itself meets a predetermined illumination condition;
   the light illumination module is specifically configured to perform infrared illumination on the non-visible spectrum imaging module after receiving the illumination signal;
   wherein the predetermined illumination condition comprises a gain level during an automatic exposure processing when the first non-visible light image is imaged being lower than a predetermined level.

2. The image collection device according to claim 1, wherein, performing brightness adjustment on the second non-visible light image based on an empirical value obtained based on a difference between the brightness component of the target visible light image and a brightness component of the second non-visible light image to obtain the target non-visible light image comprises:
   calculating a first mean value and a first variance of the brightness component, and a second mean value and a second variance of a brightness component of the second non-visible light image, respectively;
   performing global mapping processing on the brightness component of the second non-visible light image based on the first mean value, the first variance, the second mean value, and the second variance;
   convolving the target visible light image and the second non-visible light image respectively by using a preset sobel edge detection operator to obtain a first texture image corresponding to the target visible light image and a second texture image corresponding to the second non-visible light image;
   performing brightness adjustment on the second non-visible light image to determine the target non-visible light image by using a brightness component obtained after the global mapping processing, the brightness component of the target visible light image, the first texture image, and the second texture image.

3. The image collection device according to claim 2, wherein, a formula used by the processor to perform global mapping processing on the brightness component of the second non-visible light image is:

$$y_N' = \frac{\sigma_D}{\sigma_N}(y_N - \mu_N) + \mu_D$$

wherein, $y_N'$ represents the brightness component obtained after the global mapping processing, $y_N$ represents the brightness component of the second non-visible light image, $\mu_D$ represents the first mean value, $\mu_N$ represents the second mean value, $\sigma_D$ and represents the first variance, $\sigma_N$ represents the second variances;

the preset sobel edge detection operator used by the processor is:

$$sobel_{horizontal} = \begin{bmatrix} -1 & -2 & -1 \\ 0 & 0 & 0 \\ 1 & 2 & 1 \end{bmatrix}, sobel_{vertical} \begin{bmatrix} -1 & 0 & 1 \\ -2 & 0 & 2 \\ -1 & 0 & 1 \end{bmatrix}$$

a formula used by the processor to perform brightness adjustment on the second non-visible light image is:

$$y_{AP} = \frac{y'_N * t_N + y_D * t_D}{t_N + t_D}$$

wherein, $y_{AP}$ represents the target non-visible light image, $y_N'$ represents the brightness component obtained after the global mapping processing, $y_D$ represents the brightness component of the target visible light image, $t_N$ represents the second texture image, and $t_D$ represents the first texture image.

4. The image collection device according to claim 1, wherein, performing image fusion on the target visible light image and the target non-visible light image to obtain a fused image comprises:
performing weighting processing on the target visible light image and the target non-visible light image according to a corresponding first type of weight value to obtain a fused image.

5. The image collection device according to claim 1, wherein, performing image fusion on the target visible light image and the target non-visible light image to obtain a fused image comprises:
performing frequency division fusion on the target visible light image and the target non-visible light image to obtain a fused image.

6. The image collection device according to claim 5, wherein, performing frequency division fusion on the target visible light image and the target non-visible light image to obtain a fused image comprises:
performing color space conversion on the target visible light image to obtain a brightness component and a color component of the target visible light image;
performing low-pass filtering on the brightness component to obtain low frequency information of the target visible light image;
performing high-pass filtering on the target non-visible light image to obtain high frequency information of the target non-visible light image;
performing weighting processing on the low frequency information and the high frequency information according to a corresponding second type of weight value to obtain a brightness component corresponding to a fused image to be formed;
combining the brightness component corresponding to the fused image to be formed and the color component of the target visible light image to obtain the fused image.

7. The image collection device according to claim 6, wherein, a formula used by the processor to perform weighting processing on the low frequency information and the high frequency information according to the corresponding second type of weight value is:

$$y_{Fus} = w*y_{low} + (1-w)*y_{AP} + K*y_{high}$$

wherein, $y_{Fus}$ represents the brightness component corresponding to the fused image to be formed, $y_{AP}$ represents the target non-visible light image, $y_{low}$ represents the low frequency information, $y_{high}$ represents the high frequency information, w represents the second type of weight value corresponding to the low frequency information, K represents the second type of weight value corresponding to the high frequency information.

8. The image collection device according to claim 7, wherein, w is determined according to a brightness difference between the brightness components of the target non-visible light image and the target visible light image, wherein $$w = \frac{\text{abs}(y_{AP} - y_D)}{\max(\text{abs}(y_{AP} - y_D))}$$

wherein, $y_{AP}$ represents the target non-visible light image, $y_D$ represents the brightness component of the target visible light image, $\text{abs}(y_{AP}-y_D)$ represents an absolute value of $(y_{AP}-y_D)$, $\max(\text{abs}(y_{AP}-y_D))$ represented a maximum value of $\text{abs}(y_{AP}-y_D)$.

9. The image collection device according to claim 1, wherein, the visible spectrum imaging module is placed at 90° with respect to the non-visible spectrum imaging module, and a reflective surface of the light splitter is at 45° with respect to the incident light.

10. The image collection device according to claim 1, wherein, the predetermined illumination condition comprises:
a signal to noise ratio of the first non-visible light image being lower than a predetermined threshold.

11. An electronic device, comprising a housing, a processor, a memory, a circuit board, a power supply circuit, a light splitter, a visible spectrum imaging module, and a non-visible spectrum imaging module, wherein the circuit board and the light splitter are disposed within a space enclosed by the housing, the processor, the memory, the visible spectrum imaging module and the non-visible spectrum imaging module are disposed on the circuit board;
the power supply circuit is configured to supply power to each circuit or component;
the light splitter is configured to split incident light into a visible light and a non-visible light;
the visible spectrum imaging module is configured to perform photosensitive imaging according to the visible light split by the light splitter to form a visible light image;
the non-visible spectrum imaging module is configured to perform photosensitive imaging according to the non-visible light split by the light splitter to form a first non-visible light image;
the memory is configured to store executable program codes;
the processor performs the following steps by running executable program codes stored in the memory:
performing position registration on the visible light image and the first non-visible light image to obtain a target visible light image and a second non-visible light image;
performing color space conversion on the target visible light image to obtain a brightness component of the target visible light image; and performing brightness adjustment on the second non-visible light image based on an empirical value obtained based on a difference between the brightness component of the target visible light image and a brightness component of the second non-visible light image to obtain a target non-visible light image;

performing image fusion on the target visible light image and the target non-visible light image to obtain a fused image;

wherein the image collection device further comprises a light illumination module that is configured to perform infrared illumination on the non-visible spectrum imaging module;

wherein the non-visible spectrum imaging module is further configured to send an illumination signal to the light illumination module when detecting that the first non-visible light image formed itself meets a predetermined illumination condition;

the light illumination module is specifically configured to perform infrared illumination on the non-visible spectrum imaging module after receiving the illumination signal;

wherein the predetermined illumination condition comprises a gain level during an automatic exposure processing when the first non-visible light image is imaged being lower than a predetermined level.

* * * * *